US012612119B2

(12) United States Patent
Momii et al.

(10) Patent No.: US 12,612,119 B2
(45) Date of Patent: Apr. 28, 2026

(54) MOVABLE SPOILER DEVICE

(71) Applicant: Honda Motor Co., Ltd., Tokyo (JP)

(72) Inventors: Motoyuki Momii, Tokyo (JP); Kei Ambo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 18/358,045

(22) Filed: Jul. 25, 2023

(65) Prior Publication Data

US 2024/0109608 A1 Apr. 4, 2024

(30) Foreign Application Priority Data

Sep. 29, 2022 (CN) .......................... 202211198058.2

(51) Int. Cl.
B62D 35/00 (2006.01)

(52) U.S. Cl.
CPC .................................. B62D 35/007 (2013.01)

(58) Field of Classification Search
CPC .................................................... B62D 35/007
See application file for complete search history.

(56) References Cited

U.S. PATENT DOCUMENTS

| | | | | |
|---|---|---|---|---|
| 10,402 | A | * | 1/1854 | Darling ................ B62D 35/007 |
| | | | | 105/351 |
| 883,167 | A | * | 3/1908 | Carpenter ............ B60G 17/033 |
| | | | | 296/180.1 |

| | | | | |
|---|---|---|---|---|
| 1,352,679 | A | * | 9/1920 | Myers .................... B62D 35/00 |
| | | | | 296/180.1 |
| 5,165,751 | A | * | 11/1992 | Matsumoto .......... B62D 35/007 |
| | | | | 296/76 |
| 7,226,119 | B1 | * | 6/2007 | Weaver .................... B60H 1/26 |
| | | | | 296/180.1 |
| 7,481,482 | B2 | * | 1/2009 | Grave .................. B62D 35/007 |
| | | | | 296/180.1 |
| 9,102,367 | B1 | * | 8/2015 | Beierl .................... B62D 37/02 |
| 9,174,687 | B2 | * | 11/2015 | Jeong .................... B62D 35/007 |
| 10,040,492 | B2 | * | 8/2018 | Cha ....................... B62D 35/007 |
| 10,124,839 | B2 | * | 11/2018 | Povinelli ................ B62D 35/02 |
| 10,207,752 | B2 | * | 2/2019 | Causley ................. B62D 37/02 |
| 11,040,744 | B2 | * | 6/2021 | Shiga .................... B62D 35/02 |

(Continued)

OTHER PUBLICATIONS

Kantor, Alexander, Air-Conducting Apparatus for a Vehicle, Sep. 18, 2008, WO2008110135A1 (Year: 2008).*

*Primary Examiner* — Jonathan Malikasim
(74) *Attorney, Agent, or Firm* — JCIPRNET

(57) ABSTRACT

A movable spoiler device includes: a fixed part, fixed on a body of a vehicle; a movable part, configured to be movable between a storage position connected to the fixed part and a deployed position protruding from the fixed part toward rear of the vehicle; an actuator, disposed on the fixed part and drives the movable part to move in a front-rear direction of the vehicle; a link mechanism, connected to the actuator and the movable part, in which the link mechanism includes: a fixed link, rotatably supported on the fixed part with a first axis, and connected to the actuator; a movable link, rotatably supported on the fixed link with a second axis different from the first axis and connected to the movable part. The fixed link is driven to rotate by the actuator, and the movable link drives the movable part to move relative to the fixed part.

6 Claims, 9 Drawing Sheets

(56)        References Cited

U.S. PATENT DOCUMENTS

| | | | | |
|---|---|---|---|---|
| 11,753,088 B2 * | 9/2023 | Nakamura | ........... | B62D 35/007 |
| | | | | 293/9 |
| 11,891,126 B2 * | 2/2024 | Moradnia | ........... | B62D 35/007 |
| 11,993,320 B2 * | 5/2024 | Nakamura | ............. | B62D 37/02 |
| 12,221,169 B2 * | 2/2025 | Rosok | .................. | B62D 35/007 |
| 12,358,570 B2 * | 7/2025 | Nakamura | ............. | B60R 16/03 |
| 12,358,571 B2 * | 7/2025 | Nakamura | ............. | B62D 37/02 |
| 12,384,472 B2 * | 8/2025 | Nakamura | ............. | B62D 37/02 |
| 2004/0256885 A1 * | 12/2004 | Bui | ...................... | B62D 35/007 |
| | | | | 296/180.5 |
| 2015/0166130 A1 | 6/2015 | Lee et al. | | |
| 2019/0248430 A1 * | 8/2019 | Kim | ..................... | B62D 35/007 |
| 2020/0114985 A1 * | 4/2020 | Cunningham | ....... | B62D 35/007 |
| 2023/0257038 A1 * | 8/2023 | Nakamura | ............. | B62D 37/02 |
| | | | | 296/180.1 |
| 2024/0109609 A1 * | 4/2024 | Momii | ................. | B62D 35/007 |
| 2024/0109610 A1 * | 4/2024 | Momii | ................. | B62D 35/007 |
| 2024/0351645 A1 * | 10/2024 | Nakamura | ............. | B62D 37/02 |
| 2024/0375580 A1 * | 11/2024 | Lee | .......................... | B60Q 1/30 |

* cited by examiner

MOVABLE SPOILER DEVICE

CROSS-REFERENCE TO RELATED APPLICATION

This application claims the priority benefit of China application serial no. 202211198058.2 filed on Sep. 29, 2022. The entirety of the above-mentioned patent application is hereby incorporated by reference herein and made a part of this specification.

BACKGROUND

Technical Field

The disclosure relates a movable spoiler device.

Description of Related Art

In recent years, due to concerns about global warming, in order to ensure affordable, reliable, sustainable, and advanced energy access for more people, research and development on fuel efficiency improvement that contributes to energy efficiency is underway. However, the aerodynamic performance of the vehicle is an issue in the present technology regarding improvement of fuel efficiency.

In the prior art, generally, a spoiler device may be disposed at the rear end of the body of the vehicle (such as the rear bumper) to improve the aerodynamic performance of the vehicle. A common spoiler device may be a fixed spoiler with a specific shape. At present, there is also a movable spoiler device formed of a fixed part and a movable part. The movable part may move relative to the fixed part in a front-rear direction of the vehicle to change its position, thereby adjusting the aerodynamic performance. However, during the movement of the movable part in the front-rear direction of the vehicle relative to the fixed part by the driving of the link mechanism, the frictional effect generated by the complicated link mechanism is large, resulting in poor operability of the movable spoiler device (e.g., the movement of the movable part is not smooth). Therefore, it is necessary to improve the above structure of the movable spoiler device.

In order to solve the above-mentioned problems, the disclosure aims to achieve a movable spoiler device capable of reducing the frictional effect of a link mechanism and improving operability. Furthermore, it in turn contributes to energy efficiency by operating the aerodynamic device.

SUMMARY

A movable spoiler device, which may reduce the friction effect of the link mechanism and improve the operability, is provided in the disclosure.

A movable spoiler device is provided in the disclosure, including: a fixed part, fixed on a body of a vehicle; a movable part, configured to be movable between a storage position connected to the fixed part and a deployed position protruding from the fixed part toward rear of the vehicle; an actuator, disposed on the fixed part and drives the movable part to move in a front-rear direction of the vehicle; a link mechanism, disposed between the fixed part and the movable part, and connected to the actuator, in which the link mechanism includes: a fixed link, rotatably supported on the fixed part with a first axis extending in a first direction of the vehicle, and connected to the actuator; a movable link, rotatably supported on the fixed link with a second axis extending in the first direction and different from the first axis and connected to the movable part. The fixed link is driven to rotate by the actuator to drive the movable link to move, and the movable link drives the movable part to move relative to the fixed part between the storage position and the deployed position.

Based on the above, in the movable spoiler device of the disclosure, the link mechanism is disposed between the fixed part and the movable part and connected to the actuator. The link mechanism includes a fixed link and a movable link, the fixed link is rotatably supported on the fixed part with a first axis and connected to the actuator, and the movable link is rotatably supported on the fixed link with a second axis different from the first axis and connected to the movable part. Moreover, the fixed link is driven to rotate by the actuator to drive the movable link to move, and the movable link drives the movable part to move relative to the fixed part between the storage position and the deployed position. In this way, when the movable part is driven by the actuator and driven by the link mechanism to move relative to the fixed part in the front-rear direction of the vehicle, the movable part moves relative to the fixed part through the rotation of the fixed link supported by the pivot axis in the link mechanism and the movable link, which may reduce the friction effect of the link mechanism, so that the movement of the movable part is smoother. Accordingly, the movable spoiler device of the disclosure may reduce the friction effect of the link mechanism and improve the operability.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
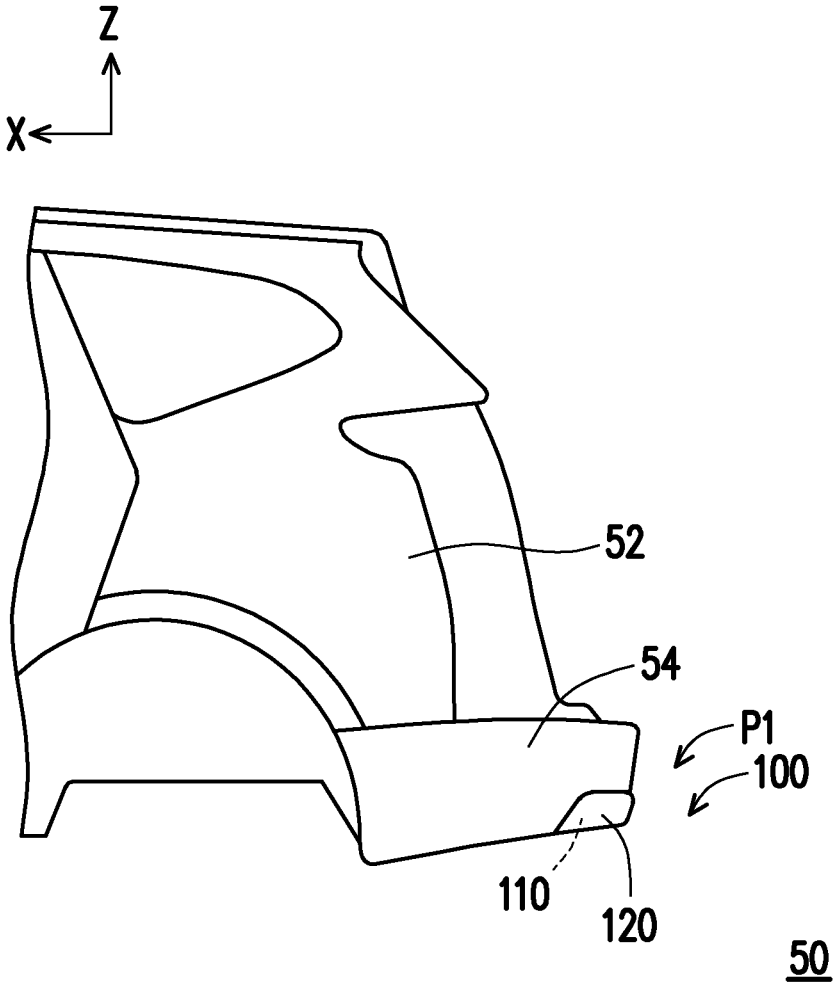
FIG. 1A and FIG. 1B are schematic diagrams of a movable spoiler device in an embodiment of the disclosure applied on a vehicle and is located in a storage position and a deployed position.
Figure 1B:
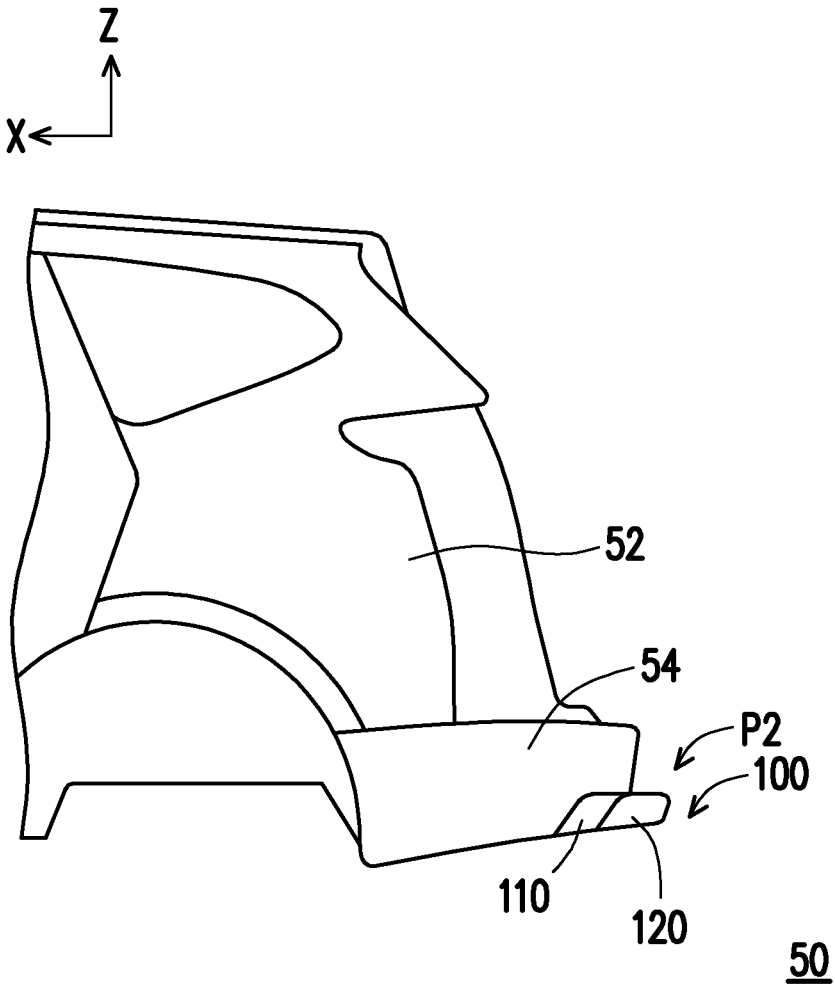
Figure 2A:
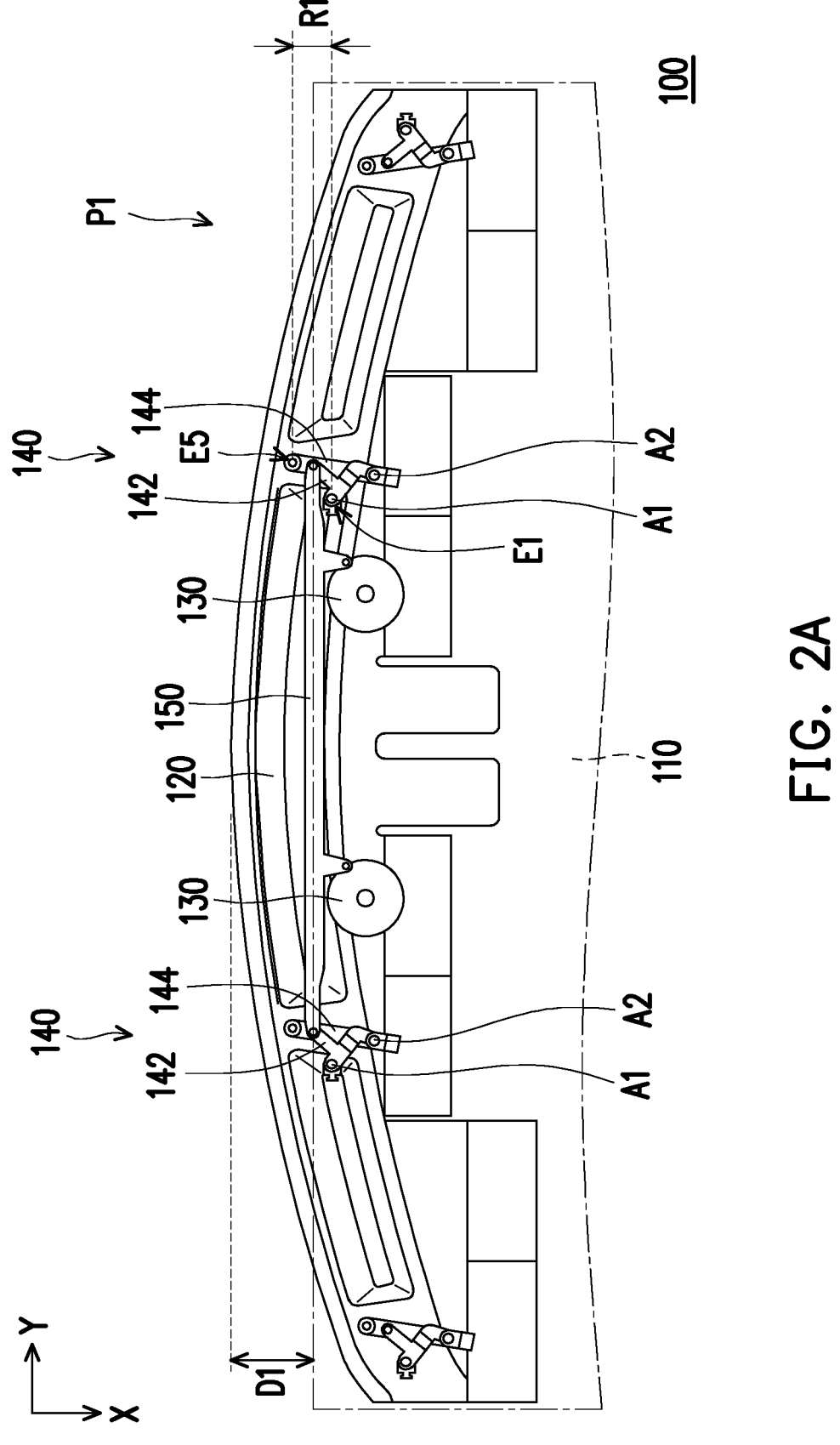
FIG. 2A and FIG. 2B are top schematic diagrams of the movable spoiler device shown in FIG. 1A and FIG. 1B at the storage position and the deployed position.
Figure 2B:
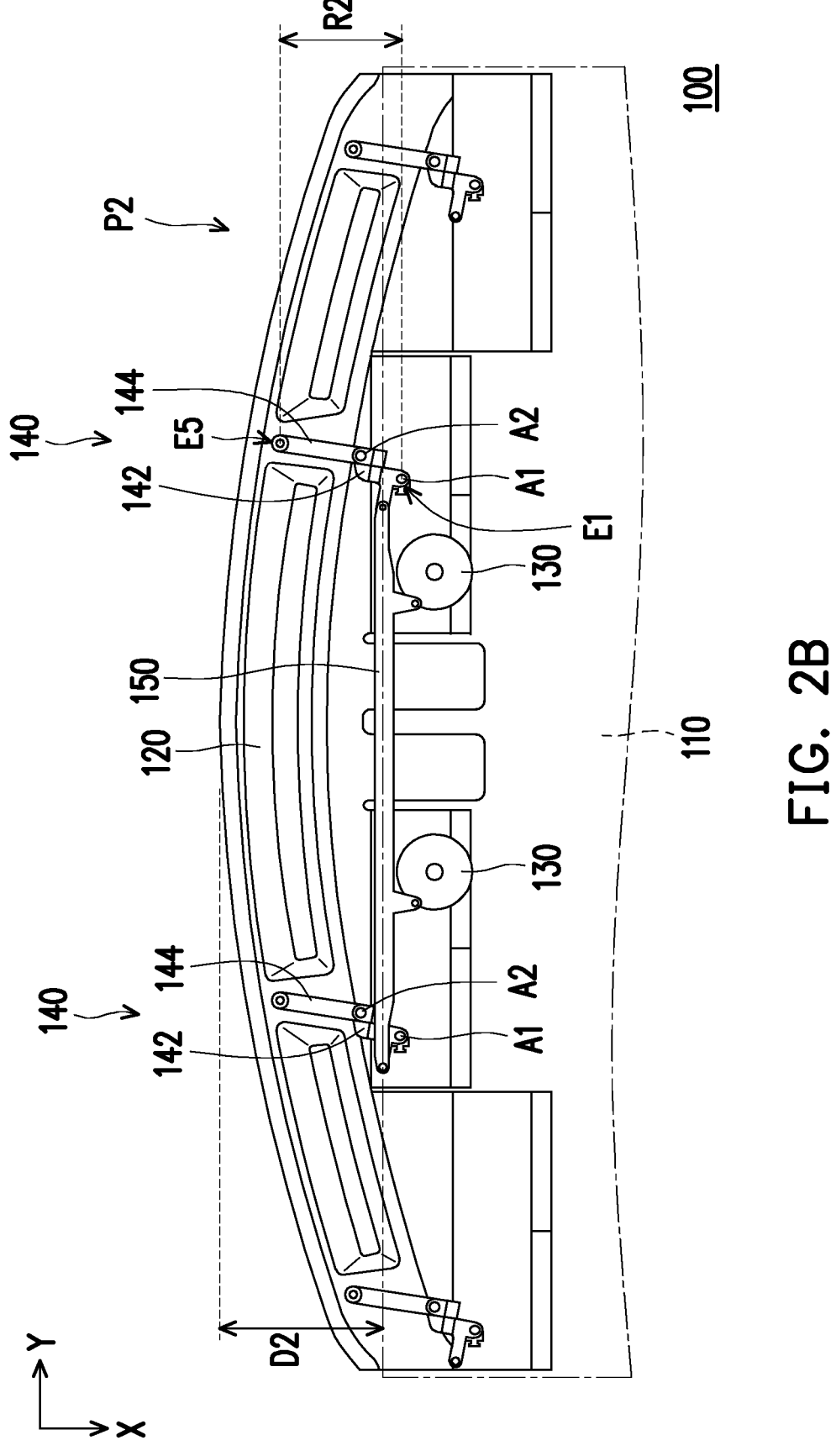
Figure 3A:
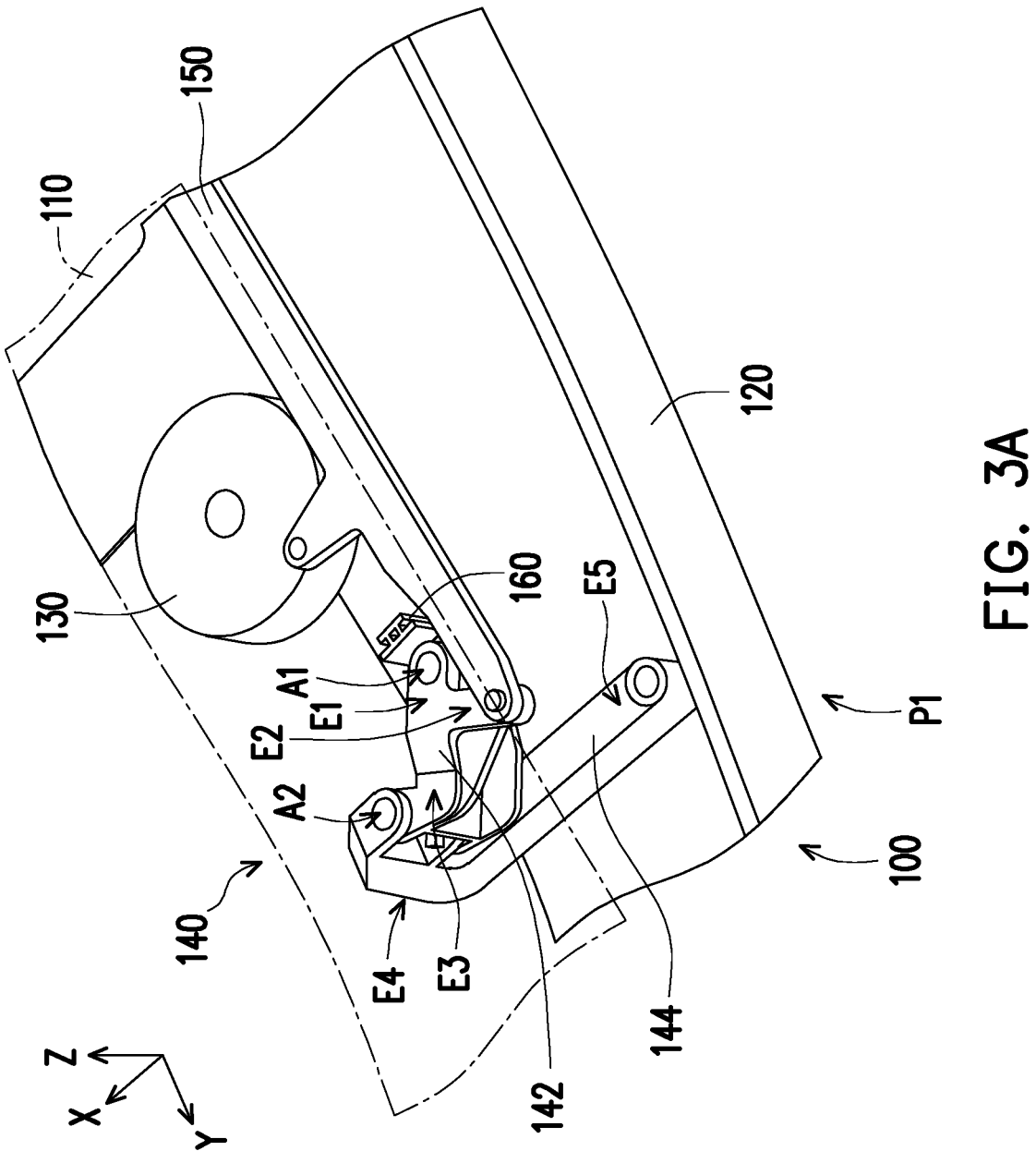
FIG. 3A and FIG. 3B are partial enlarged appearance schematic diagrams of the movable spoiler device shown in FIG. 2A and FIG. 2B at the storage position and the deployed position.
Figure 3B:
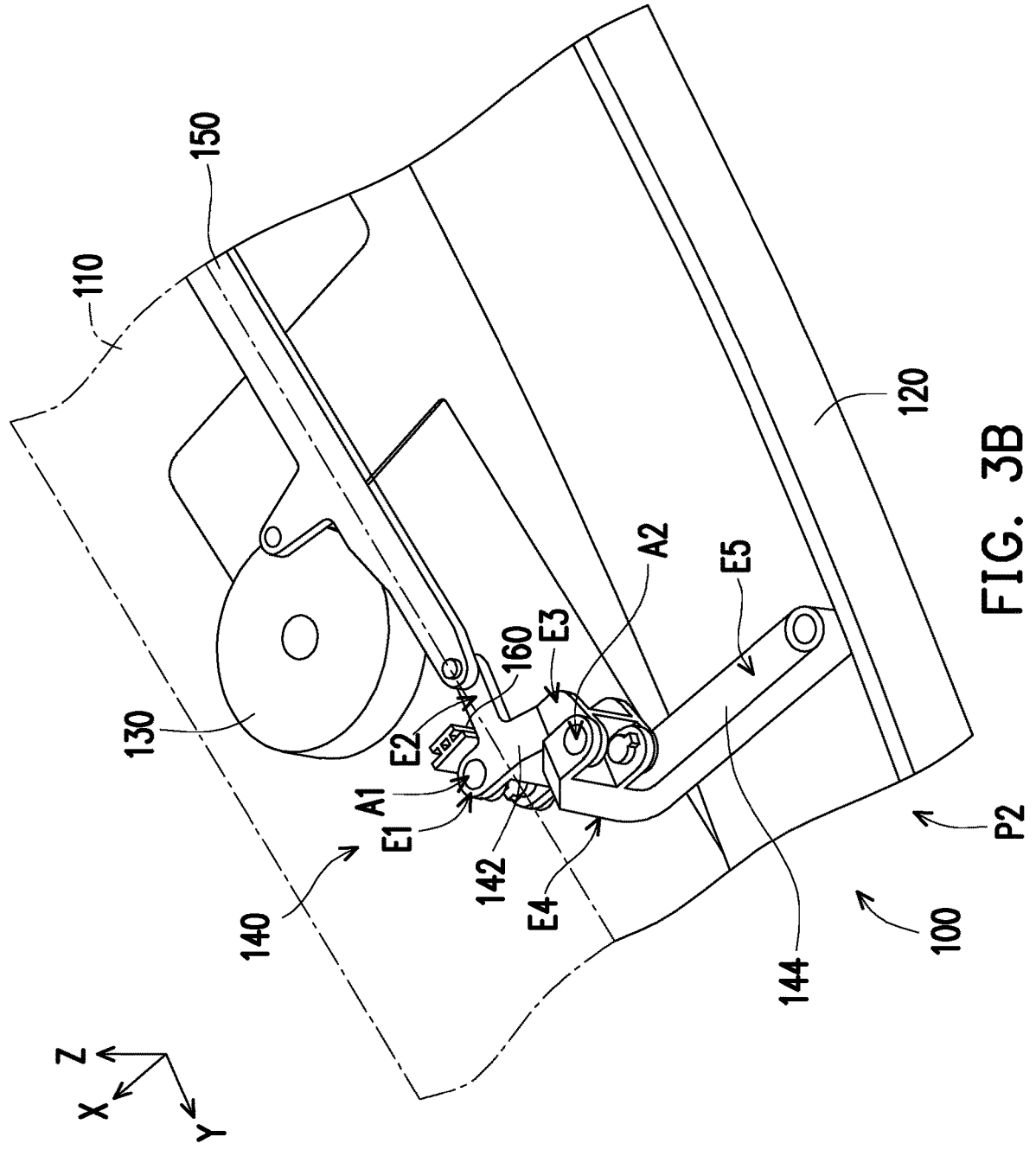
Figure 4A:
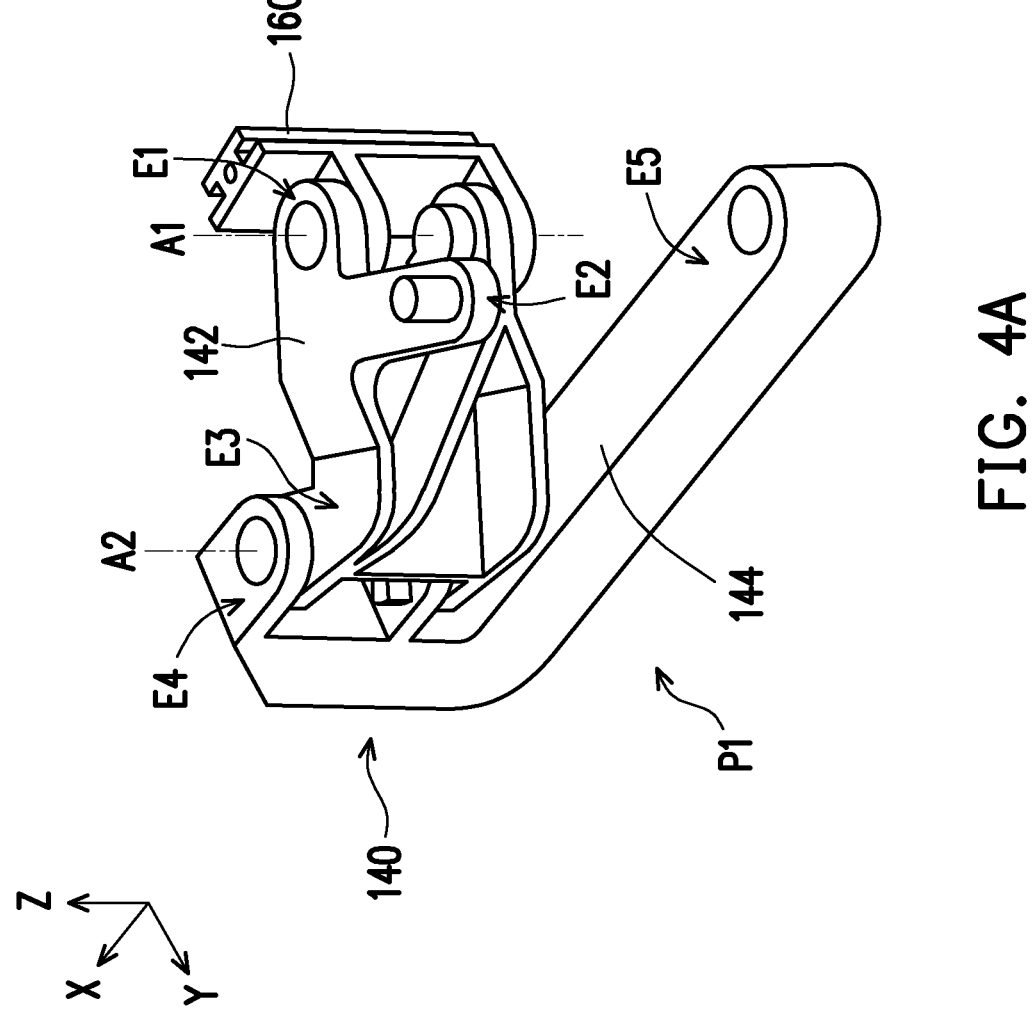
FIG. 4A and FIG. 4B are appearance schematic diagrams of the link mechanism used in the movable spoiler device shown in FIG. 2A and FIG. 2B at the storage position and the deployed position.
Figure 4B:
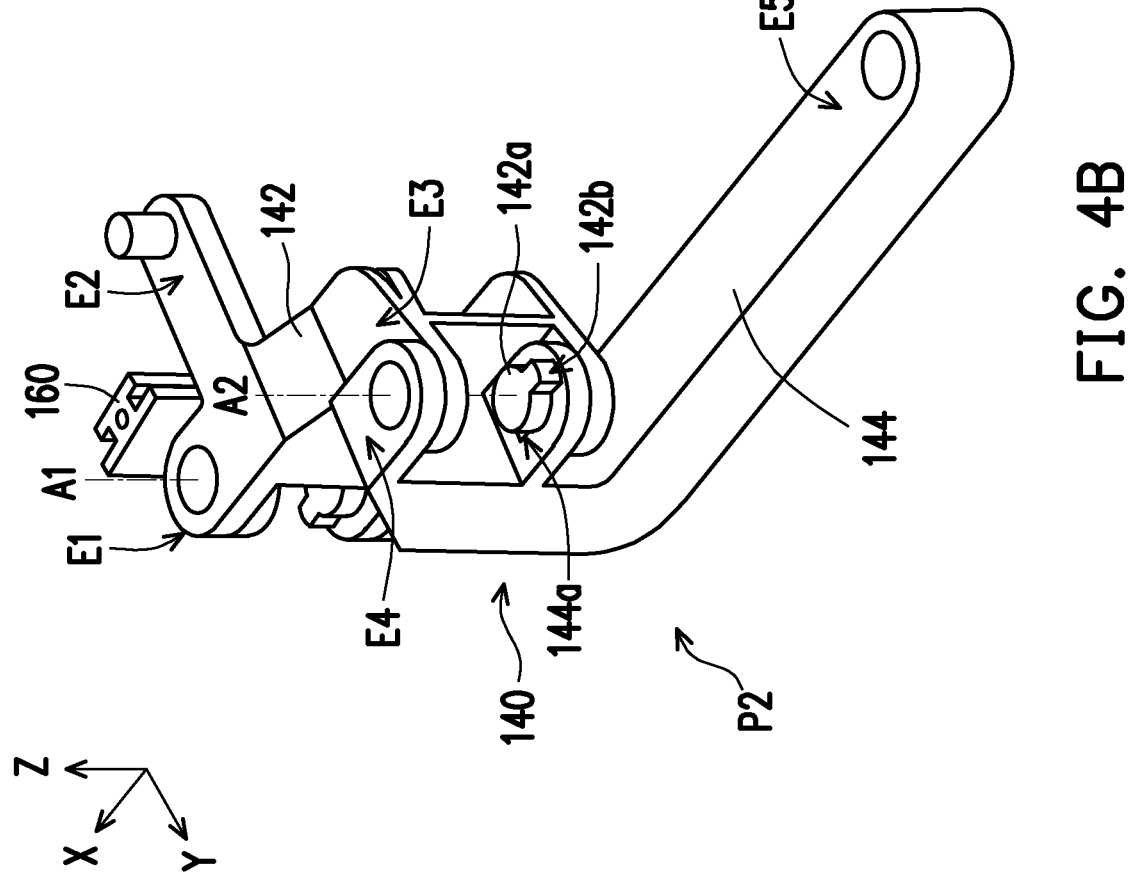
Figure 5:
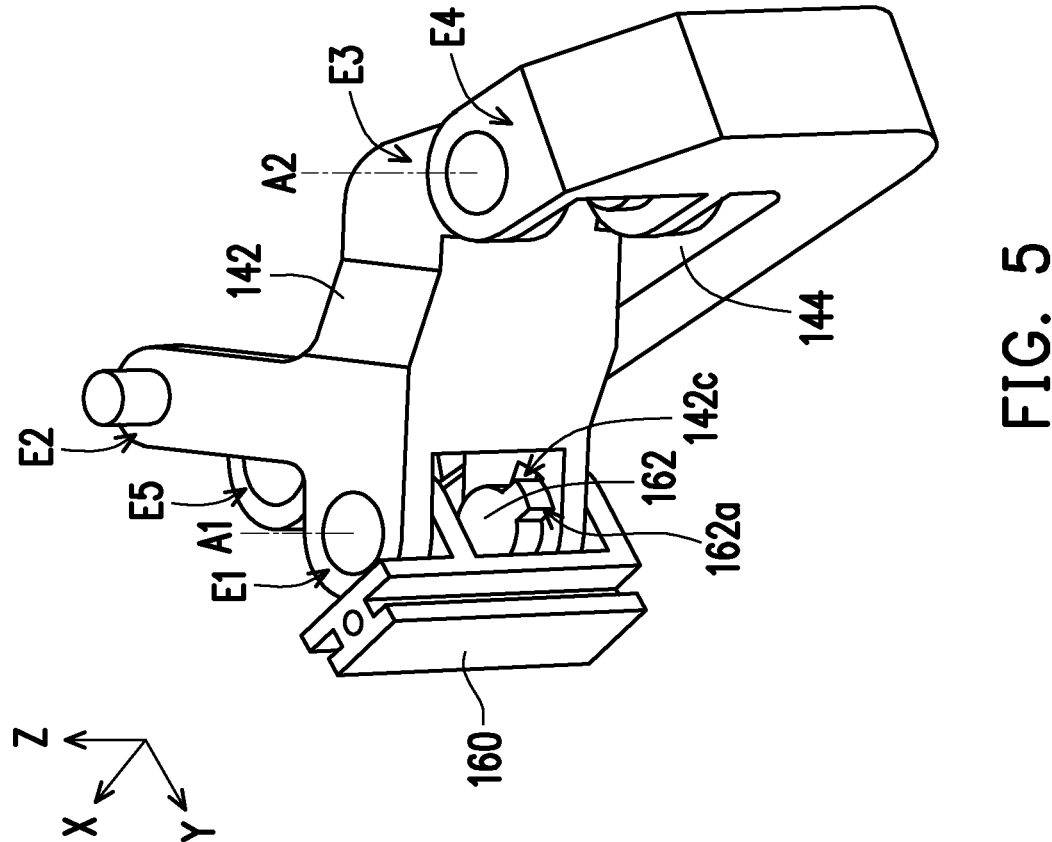
FIG. 5 is an appearance schematic diagram of the link mechanism in FIG. 4A from another viewing angle.

References of the exemplary embodiments of the disclosure are to be made in detail. Examples of the exemplary embodiments are illustrated in the drawings. FIG. 1A and FIG. 1B are schematic diagrams of a movable spoiler device in an embodiment of the disclosure applied on a vehicle and is located in a storage position and a deployed position. FIG. 2A and FIG. 2B are top schematic diagrams of the movable spoiler device shown in FIG. 1A and FIG. 1B at the storage position and the deployed position. FIG. 3A and FIG. 3B are partial enlarged appearance schematic diagrams of the movable spoiler device shown in FIG. 2A and FIG. 2B at the storage position and the deployed position. FIG. 4A and FIG. 4B are appearance schematic diagrams of the link mechanism used in the movable spoiler device shown in FIG. 2A and FIG. 2B at the storage position and the deployed position. FIG. 5 is an appearance schematic diagram of the link mechanism in FIG. 4A from another viewing angle. The application and specific structure of the movable spoiler device 100 of this embodiment is described below with reference to FIG. 1A to FIG. 5. The front-rear direction of the vehicle described later refers to, for example, the front-rear direction X in the accompanying drawings, and the direction indicated by the arrow is the front. The left-right direction of the vehicle refers to, for example, the left-right direction Y in the accompanying drawings, and the direction indicated by the arrow is the left. The up-down direction serving as the first direction of the vehicle refers to, for example, the up-down direction Z in the accompanying drawings, and the direction indicated by the arrow is upward. This is only one example of the disclosure, and the disclosure is not limited thereto.

In one embodiment of the disclosure, a pair of the fixed links and a pair of the movable links are provided on opposite sides of the vehicle in a left-right direction, and the actuator is connected to a pair of the fixed links via a connecting member to drive a pair of the fixed links to rotate.

In an embodiment of the disclosure, a rotation direction of the pair of the fixed links driven by the actuator is the same.

In an embodiment of the disclosure, the fixed link includes a first end, a second end, and a third end, the first end is connected to the fixed part in a rotatable manner about the first axis, the second end is connected to the actuator, and the third end is connected to the movable link in a rotatable manner about the second axis.

In an embodiment of the disclosure, the movable link includes a fourth end and a fifth end, the fourth end is connected to the third end of the fixed link in a rotatable manner about the second axis, and the fifth end is connected to the movable part.

In an embodiment of the disclosure, a rotation direction of the fixed link along the first axis is the same as a rotation direction of the movable link along the second axis.

Referring to FIG. 1A and FIG. 1B, in this embodiment, the movable spoiler device 100 is adapted to be installed on the body 52 of the vehicle 50 as an exterior component, so as to stabilize the airflow flowing through the vehicle 50, thereby improving the aerodynamic performance. The movable spoiler device 100 is, for example, a long and narrow structure extending along the left-right direction Y (e.g., as shown in FIG. 2A and FIG. 2B), which is the second direction of the vehicle 50, across the left and right sides of the vehicle 50, and disposed on the rear bumper 54 at the rear end of the body 52. Furthermore, as in the state shown in FIG. 1A and FIG. 1B, the movable spoiler device 100 may move in the front-rear direction X of the vehicle 50, such as moving between a storage position P1 connected to the rear bumper 54 and a deployed position P2 protruding from the rear bumper 54 toward the rear (i.e., the direction opposite to the direction indicated by the arrow in the front-back direction X) of the vehicle 50. However, in other embodiments not shown, the movable spoiler device 100 may be disposed on other parts of the body 52 of the vehicle 50, and the disclosure does not limit the application of the movable spoiler device 100 on the vehicle 50, which may be adjusted according to requirements.

Specifically, in this embodiment, as shown in FIG. 1A to FIG. 3B, the movable spoiler device 100 includes a fixed part 110, a movable part 120, an actuator 130, and a link mechanism 140. The fixed part 110 is fixed to the body 52 of the vehicle 50 (e.g., fixed to the rear bumper 54 shown in FIG. 1A and FIG. 1B). The movable part 120 is configured to be movable between a storage position P1 connected to the fixed part 110 and a deployed position P2 protruding from the fixed part 110 toward the rear (i.e., the direction opposite to the direction indicated by the arrow in the front-back direction X) of the vehicle 50. The actuator 130 is disposed on the fixed part 110 and drives the movable part 120 to move in the front-rear direction X of the vehicle. The link mechanism 140 is disposed between the fixed part 110 and the movable part 120, and is connected to the actuator 130 to drive the movable part 120 to move in the front-rear direction X of the vehicle 50 relative to the fixed part 110 through the driving of the actuator 130, that is, to move between the storage position P1 and the deployed position P2.

As an example, in this embodiment, the fixed part 110 and the movable part 120 are each formed into a plate-like structure (not limited to a single plate, but also a combination of multiple plates) and connected to each other. The link mechanism 140 is disposed between the fixed part 110 and the movable part 120, and is contracted or expanded between the fixed part 110 and the movable part 120 through the driving of the actuator 130, thereby driving the movable part 120 to move in the front-rear direction X of the vehicle 50 relative to the fixed part 110. The specific structure and connection method of the actuator 130 may be adjusted according to requirements, and the disclosure is not limited thereto.

The storage position P1 corresponds to the position shown in FIG. 1A, FIG. 2A, and FIG. 3A, the movable part 120 located at the storage position P1 is configured to be connected to the fixed part 110, and there is a relative distance D1 (as shown in FIG. 2A) between the outer ends of the fixed part 110 and the movable part 120. Correspondingly, the deployed position P2 corresponds to the position shown in FIG. 1B, FIG. 2B, and FIG. 3B, the movable part 120 located at the deployed position P2 is configured to move further to the rear relative to the fixed part 110, and there is a relative distance D2 (as shown in FIG. 2B) between the outer ends of the fixed part 110 and the movable part 120.

It may be seen that, in this embodiment, the movable part 120 located at the deployed position P2 is further to the rear than the movable part 120 located at the storage position P1, so that the relative distance D2 when the movable part 120 is located at the deployed position P2 is greater than the relative distance D1 when the movable part 120 is located at the storage position P1. Therefore, the movable spoiler device 100 may adjust the position of the movable part 120 relative to the fixed part 110 through the driving of the actuator 130 according to the requirement, so as to adjust the airflow flowing through the vehicle 50 and improve the aerodynamic performance according to the requirement. However, the disclosure does not limit the relative distances D1 and D2 between the movable part 120 and the fixed part 110 at the storage position P1 and the deployed position P2, which may be adjusted according to requirements.

Moreover, as shown in FIG. 2A to FIG. 3B, in this embodiment, the link mechanism 140 includes a fixed link 142 and a movable link 144. The fixed link 142 is rotatably supported on the fixed part 110 (shown as a dashed line portion in FIG. 2A to FIG. 3B) with a first axis A1 extending in the up-down direction Z (the first direction of the vehicle 50) of the vehicle 50, and is connected to the actuator 130 (e.g., the actuator 130 is connected via the connecting member 150 described later). The movable link 144 is rotatably supported on the fixed link 142 with a second axis A2 different from the first axis A1 extending in the up-down direction Z (the first direction), and is connected to the movable part 120. The first axis A1 and the second axis A2 are parallel to each other, and both extend in the up-down direction Z, but may be configured to extend in the left-right direction Y, or may not be parallel to each other. Furthermore, the fixed link 142 is driven by the actuator 130 (e.g., through the linkage of the connecting member 150 described later) to rotate, so as to drive the movable link 144 to move, and the movable link 144 drives the movable part 120 to move relative to the fixed part 110 between the storage position P1 and the deployed position P2.

Thus, as an example, when the movable part 120 is located at the storage position P1 as shown in FIG. 2A and FIG. 3A, driven by the actuator 130 (e.g., the actuator 130 rotates counterclockwise and drives the fixed link 142 via the connecting member 150), the fixed link 142 rotates counterclockwise relative to the fixed part 110 with the first axis A1 as the axis, and drives the movable link 144 to rotate counterclockwise relative to the fixed link 142 with the second axis A2 as the axis, so that the movable link 144 moves to the rear of the vehicle 50 in the front-rear direction X, and drives the movable part 120 to move relative to the fixed part 110 to the deployed position P2 as shown in FIG. 2B and FIG. 3B. The rotation direction of the fixed link 142 along the first axis A1 is the same as the rotation direction of the movable link 144 along the second axis A2 (e.g., they both rotate counterclockwise).

Correspondingly, when the movable part 120 is located at the deployed position P2 as shown in FIG. 2B and FIG. 3B, driven by the actuator 130 (e.g., the actuator 130 rotates clockwise and drives the fixed link 142 via the connecting member 150), the fixed link 142 rotates clockwise relative to the fixed part 110 with the first axis A1 as the axis, and drives the movable link 144 to rotate clockwise relative to the fixed link 142 with the second axis A2 as the axis, so that the movable link 144 moves to the front of the vehicle 50 in the front-rear direction X, and drives the movable part 120 to move relative to the fixed part 110 to the storage position P1 as shown in FIG. 2A and FIG. 3A. The rotation direction of the fixed link 142 along the first axis A1 is the same as the rotation direction of the movable link 144 along the second axis A2 (e.g., they both rotate clockwise). However, the rotation directions of the actuator 130, the fixed link 142, and the movable link 144 may be adjusted according to requirements, and the disclosure is not limited thereto.

It may be seen, in the movable spoiler device 100, the link mechanism 140 is disposed between the fixed part 110 and the movable part 120 and connected to the actuator 130. The link mechanism 140 includes a fixed link 142 and a movable link 144, the fixed link 142 is rotatably supported on the fixed part 110 with a first axis A1 and connected to the actuator 130, and the movable link 144 is rotatably supported on the fixed link 142 with a second axis A2 different from the first axis A1 and connected to the movable part 120. Moreover, the fixed link 142 is driven to rotate by the actuator 130 to drive the movable link 144 to move, and the movable link 144 drives the movable part 120 to move relative to the fixed part 110 between the storage position P1 and the deployed position P2. In this way, when the movable part 120 is driven by the actuator 130 and driven by the link mechanism 140 to move relative to the fixed part 110 in the front-rear direction X of the vehicle, the movable part 120 moves relative to the fixed part 110 through the rotation of the fixed link 142 supported by the pivot axis in the link mechanism 140 and the movable link 144, which may reduce the friction effect of the link mechanism 140, so that the movement of the movable part 120 is smoother. Accordingly, the movable spoiler device 100 may reduce the friction effect of the link mechanism 140 and improve the operability.

Furthermore, in this embodiment, as shown in FIG. 2A and FIG. 2B, a pair of link mechanisms 140 (a pair of fixed links 142 and a pair of movable links 144) are provided on opposite sides of the vehicle 50 in the left-right direction Y (the second direction of the vehicle 50). A pair of actuators 130 connects the fixed links 142 of the pair of link mechanisms 140 via the connecting member 150 to drive the pair of link mechanisms 140 to contract or expand between the fixed part 110 and the movable part 120 substantially simultaneously (i.e., the pair of fixed links 142 is driven to rotate substantially simultaneously). Substantially simultaneous driving means that although simultaneous driving is desired, a slight delay due to the operation of the link mechanism 140 is allowed. The opposite ends of the connecting member 150 in the left-right direction Y are respectively connected to a pair of fixed links 142, and the inner part of the connecting member 150 in the left-right direction Y is connected to the actuator 130 (the connecting part may be adjusted according to the position of the actuator 130). The pair of link mechanisms 140 is disposed such that the movable part 120 may move more smoothly relative to the fixed part 110, the pair of actuators 130 is disposed such that it is easier to drive the link mechanisms 140, and the connecting member 150 is disposed such that the driving of the left and right sides are synchronized. However, in other embodiments not shown, only one actuator 130 may be provided, and a pair of fixed links 142 may be connected via a connecting member 150. Alternatively, a pair of connecting members 150 may also be provided, and each of the pair of actuators 130 is connected to the corresponding fixed link 142 via the corresponding connecting member 150. A combination of one actuator 130 with a pair of connecting members 150 and a pair of fixed links 142 may also be adopted. The disclosure does not limit the number of the actuator 130, the link mechanism 140 (the fixed link 142 and the movable link 144), and the connecting member 150, which may be adjusted according to requirements.

Thus, as an example, when the movable part 120 is located at the storage position P1 as shown in FIG. 2A and FIG. 3A, driven by the actuator 130 (e.g., the actuator 130 rotates counterclockwise), the connecting member 150 moves to the right (i.e., the direction opposite to the direction indicated by the arrow in the left-right direction Y) in the left-right direction Y of the vehicle 50, so as to drive the pair of fixed links 142 to rotate counterclockwise relative to the fixed part 110 with the respective first axis A1 as the axis. Thus, as described above, the movable part 120 is driven to move relative to the fixed part 110 to the deployed position P2 as shown in FIG. 2B and FIG. 3B. The rotation directions of the pair of fixed links 142 driven substantially simultaneously by the actuator 130 are the same (e.g., they both rotate counterclockwise).

Correspondingly, when the movable part 120 is located at the deployed position P2 as shown in FIG. 2B and FIG. 3B, driven by the actuator 130 (e.g., the actuator 130 rotates clockwise), the connecting member 150 moves to the left (i.e., the direction indicated by the arrow in the left-right direction Y) in the left-right direction Y of the vehicle 50, so as to drive the pair of fixed links 142 to rotate clockwise relative to the fixed part 110 with the respective first axis A1 as the axis. Thus, as described above, the movable part 120 is driven to move relative to the fixed part 110 to the storage position P1 as shown in FIG. 2A and FIG. 3A. The rotation directions of the pair of fixed links 142 driven substantially simultaneously by the actuator 130 are the same (e.g., they both rotate clockwise). However, the rotation directions of the actuator 130, the link mechanism 140 (the fixed link 142 and the movable link 144), and the moving direction of the connecting member 150 may be adjusted according to requirements, and the disclosure is not limited thereto.

Furthermore, in this embodiment, as shown in FIG. 3A to FIG. 4B, the fixed link 142 includes a first end E1, a second end E2, and a third end E3. The first end E1 is connected to the fixed part 110 in a rotatable manner about the first axis A1 (e.g., the first axis A1 is rotatably supported on the base 160 fixed on the fixed part 110), the second end E2 is connected to the actuator 130 (e.g., connected via the connecting member 150), and the third end E3 is connected to the movable link 144 in a rotatable manner about the second axis A2. Furthermore, the movable link 144 includes a fourth end E4 and a fifth end E5. The fourth end E4 is connected to the third end E3 of the fixed link 142 in a rotatable manner about the second axis A2, and the fifth end E5 is connected to the movable part 120.

Furthermore, the first end E1 and the third end E3 of the fixed link 142 are opposite ends of the link, and the part of the link near the first end E1 is provided with a second end E2 extending outward. Moreover, the fourth end E4 and the fifth end E5 of the movable link 144 are opposite ends of the link. Furthermore, the fourth end E4 is connected to the third end E3 to form a link mechanism 140, the first end E1 is connected to the fixed part 110 and the fifth end E5 is connected to the movable part 120, to be linked between the fixed part 110 and the movable part 120, and the second end E2 is connected to the actuator 130 via the connecting member 150, so as to drive the movable part 120 to move in the front-rear direction X relative to the fixed part 110 according to the driving of the actuator 130.

Thus, as an example, when the movable part 120 is located at the storage position P1 as shown in FIG. 3A, driven by the actuator 130 (e.g., the actuator 130 rotates counterclockwise), the connecting member 150 drives the second end E2 of the fixed link 142 to move to the right in the left-right direction Y, so that the first end E1 of the fixed link 142 rotates counterclockwise relative to the fixed part 110 with the first axis A1 as the axis (the first end E1 is connected to the fixed part 110 via the base 160, so it is not displaced relative to the fixed part 110). The third end E3 of the fixed link 142 drives the fourth end E4 of the movable link 144 to rotate counterclockwise relative to the fixed link 142 with the second axis A2 as the axis. As a result, the fifth end E5 of the movable link 144 moves towards the rear, and drives the movable part 120 to move relative to the fixed part 110 to the deployed position P2 as shown in FIG. 3B.

Correspondingly, when the movable part 120 is located at the deployed position P2 as shown in FIG. 3B, driven by the actuator 130 (e.g., the actuator 130 rotates clockwise), the connecting member 150 drives the second end E2 of the fixed link 142 to move to the left in the left-right direction Y, so that the first end E1 of the fixed link 142 rotates clockwise relative to the fixed part 110 with the first axis A1 as the axis. The third end E3 of the fixed link 142 drives the fourth end E4 of the movable link 144 to rotate counterclockwise relative to the fixed link 142 with the second axis A2 as the axis. As a result, the fifth end E5 of the movable link 144 moves towards the front, and drives the movable part 120 to move relative to the fixed part 110 to the storage position P1 as shown in FIG. 2A and FIG. 3A.

When the movable part 120 is located in the storage position P1 shown in FIG. 2A and FIG. 3A, the fixed link 142 and the movable link 144 of the link mechanism 140 contract with each other (e.g., there is a vertical distance R1 between the first end E1 of the fixed link 142 and the fifth end E5 of the movable link 144 as shown in FIG. 2A). Correspondingly, when the movable part 120 is located in the deployed position P2 shown in FIG. 2B and FIG. 3B, the fixed link 142 and the movable link 144 of the link mechanism 140 expand from each other (e.g., there is a vertical distance R2 between the first end E1 of the fixed link 142 and the fifth end E5 of the movable link 144 as shown in FIG. 2B). The link mechanism 140 has a larger dimension (e.g., the vertical distance R2 shown in FIG. 2B) in the deployed position P2 than the dimension in the storage position P1 (e.g., the vertical distance R1 shown in FIG. 2A), so that the link mechanism 140 may increase the relative distance between the movable part 120 and the fixed part 110 when it is at the deployed position P2 (e.g., the relative distance D2 in the deployed position P2 shown in FIG. 2B is greater than the relative distance D1 in the storage position P1 shown in FIG. 2A). As a result, the position of the movable part 120 relative to the fixed part 110 in the front-rear direction X of the vehicle 50 may be adjusted to improve the aerodynamic performance by adjusting the airflow flowing through the vehicle 50. However, the disclosure does not limit the specific structures of the fixed link 142 and the movable link 144, which may be adjusted according to requirements.

In addition, in this embodiment, as shown in FIG. 4B, the third end E3 of the fixed link 142 is provided with a locking portion 142a, and the fourth end E4 of the movable link 144 is provided with a locking hole 144a. The locking portion 142a is provided with a protrusion 142b for interfering with the outer peripheral edge of the locking hole 144a, and the shape of the locking portion 142a corresponds to the shape of the locking hole 144a, so that the fourth end E4 of the movable link 144 may pass through the locking portion 142a through the locking hole 144a to be assembled to the third end E3 of the fixed link 142, and be locked by the protrusion 142b through rotation. Furthermore, in the assembled link mechanism 140, the range in which the fourth end E4 of the movable link 144 rotates with the second axis A2 as the axis does not pass through the position of the protrusion 142b, so that the movable link 144 does not fall off from the fixed link 142 during operation. However, the disclosure does not limit the connection manner between the fixed link 142 and the movable link 144, which may be adjusted according to requirements.

Similarly, as shown in FIG. 5, the base 160 is provided with a locking portion 162, and the first end E1 of the fixed link 142 is provided with a locking hole 142c. The locking portion 162 is provided with a protrusion 162a for interfering with the outer peripheral edge of the locking hole 142c, and the shape of the locking portion 162 corresponds to the shape of the locking hole 142c, so that the first end E1 of the fixed link 142 may pass through the locking portion 162 through the locking hole 142c to be assembled on the base 160, and be locked by the protrusion 162a through rotation. Furthermore, in the assembled link mechanism 140, the range in which the first end E1 of the fixed link 142 rotates with the first axis A1 as the axis does not pass through the position of the protrusion 162a, so that the fixed link 142 does not fall off from the base 160 during operation. However, the disclosure does not limit the connection manner between the base 160 and the fixed link 142, which may be adjusted according to requirements.

To sum up, in the movable spoiler device of the disclosure, the link mechanism is disposed between the fixed part and the movable part and connected to the actuator. The link mechanism includes a fixed link and a movable link, the fixed link is rotatably supported on the fixed part with a first axis and connected to the actuator, and the movable link is rotatably supported on the fixed link with a second axis different from the first axis and connected to the movable part. Moreover, the fixed link is driven to rotate by the actuator to drive the movable link to move, and the movable link drives the movable part to move relative to the fixed part between the storage position and the deployed position. Preferably, a pair of fixed links and a pair of the movable links are provided on opposite sides of the vehicle in a left-right direction, and the actuator is connected to the pair of the fixed links via a connecting member to drive the pair of the fixed links to rotate. In this way, when the movable part is driven by the actuator and driven by the link mechanism to move relative to the fixed part in the front-rear direction of the vehicle, the movable part moves relative to the fixed part through the rotation of the fixed link supported by the pivot axis in the link mechanism and the movable link, which may reduce the friction effect of the link mechanism, so that the movement of the movable part is smoother. Accordingly, the movable spoiler device of the disclosure may reduce the friction effect of the link mechanism and improve the operability.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A movable spoiler device, comprising:
a fixed part, fixed on a body of a vehicle;
a movable part, configured to be movable between a storage position connected to the fixed part and a deployed position protruding from the fixed part towards rear of the vehicle;
an actuator, disposed on the fixed part and driving the movable part to move in a front-rear direction of the vehicle;
a link mechanism, disposed between the fixed part and the movable part, and connected to the actuator, wherein the link mechanism comprising:
a fixed link, rotatably supported on the fixed part with a first axis extending in a first direction of the vehicle, and connected to the actuator; and
a movable link, rotatably supported on the fixed link with a second axis extending in the first direction and different from the first axis, and connected to the movable part,
wherein the fixed link is driven to rotate by the actuator to drive the movable link to move, and the movable link drives the movable part to move relative to the fixed part between the storage position and the deployed position,
a pair of the fixed links and a pair of the movable links are provided on opposite sides of the vehicle in a left-right direction, and the actuator is connected to the pair of the fixed links via a connecting member to drive the pair of the fixed links to rotate,
the fixed link comprises a first end, a second end, and a third end, the first end is connected to the fixed part in a rotatable manner about the first axis, the second end is connected to the actuator, and the third end is connected to the movable link in a rotatable manner about the second axis.

2. The movable spoiler device according to claim 1, wherein a rotation direction of the pair of the fixed links driven by the actuator is the same.

3. The movable spoiler device according to claim 2, wherein
a rotation direction of the fixed link along the first axis is the same as a rotation direction of the movable link along the second axis.

4. The movable spoiler device according to claim 1, wherein
the movable link comprises a fourth end and a fifth end, the fourth end is connected to the third end of the fixed link in a rotatable manner about the second axis, and the fifth end is connected to the movable part.

5. The movable spoiler device according to claim 4, wherein
a rotation direction of the fixed link along the first axis is the same as a rotation direction of the movable link along the second axis.

6. The movable spoiler device according to claim 1, wherein
a rotation direction of the fixed link along the first axis is the same as a rotation direction of the movable link along the second axis.

* * * * *